(12) United States Patent
Chae

(10) Patent No.: US 7,028,121 B2
(45) Date of Patent: Apr. 11, 2006

(54) PARAMETER GENERATING CIRCUIT FOR DECIDING PRIORITY OF MASTER BLOCKS AND METHOD OF GENERATING PARAMETER

(75) Inventor: Kwan-yeob Chae, Seoul (KR)

(73) Assignee: Samsung Electronics Co., Ltd., (KR)

( * ) Notice: Subject to any disclaimer, the term of this patent is extended or adjusted under 35 U.S.C. 154(b) by 358 days.

(21) Appl. No.: 10/677,666

(22) Filed: Oct. 2, 2003

(65) Prior Publication Data

US 2004/0073732 A1    Apr. 15, 2004

(30) Foreign Application Priority Data

Oct. 14, 2002    (KR) .................. 10-2002-0062571

(51) Int. Cl.
G06F 12/00    (2006.01)
G06F 13/14    (2006.01)
G06F 13/38    (2006.01)

(52) U.S. Cl. .................. 710/240; 710/244; 710/116
(58) Field of Classification Search ............ None
See application file for complete search history.

(56) References Cited

U.S. PATENT DOCUMENTS

| | | | | |
|---|---|---|---|---|
| 5,241,632 | A * | 8/1993 | O'Connell et al. | 710/117 |
| 5,598,542 | A | 1/1997 | Leung | 395/297 |
| 5,778,200 | A * | 7/1998 | Gulick | 710/113 |
| 5,862,353 | A * | 1/1999 | Revilla et al. | 710/107 |
| 5,862,355 | A * | 1/1999 | Logsdon | 710/116 |
| 5,940,455 | A * | 8/1999 | Ikeda | 375/350 |
| 5,956,493 | A * | 9/1999 | Hewitt et al. | 710/113 |
| 6,088,751 | A * | 7/2000 | Jaramillo | 710/116 |
| 6,246,256 | B1 * | 6/2001 | Liu et al. | 326/38 |
| 6,301,642 | B1 * | 10/2001 | Jones et al. | 711/151 |
| 6,704,821 | B1 * | 3/2004 | Scandurra et al. | 710/243 |
| 6,917,995 | B1 * | 7/2005 | Hirose et al. | 710/107 |

* cited by examiner

*Primary Examiner*—Rehana Perveen
*Assistant Examiner*—Faisal Zaman
(74) *Attorney, Agent, or Firm*—Mills & Onello LLP

(57) ABSTRACT

Provided are a parameter generating circuit and a method of generating a parameter which decides priority of master blocks. An arbitration parameter generating circuit includes a counter, a short term arbitration parameter storage unit, a short term reference time measurement unit, a long term arbitration parameter control unit and a long term reference time measurement unit. The counter receives a request signal generated in order for a master block to occupy a system bus and a grant signal generated in order for an arbitrator to allow the master block to occupy the system bus, up-counts when the request signal is at a first logic level, down-counts when the grant signal is at the first logic level, and is reset in response to a predetermined short term reference time signal. The short term arbitration parameter storage unit receives and stores the counted signal as the short term arbitration parameter until the counter is reset in response to the short term reference time signal. The long term arbitration parameter control unit continuously accumulates the short term arbitration parameter outputted from the short term arbitration parameter storage unit, outputs the accumulated short term arbitration parameter as a long term arbitration parameter, and is reset in response to the long term reference time signal.

31 Claims, 10 Drawing Sheets

PARAMETER GENERATING CIRCUIT FOR DECIDING PRIORITY OF MASTER BLOCKS AND METHOD OF GENERATING PARAMETER

BACKGROUND OF THE INVENTION

This application claims the priority of Korean Patent Application No. 2002-62571, filed on Oct. 14, 2002, in the Korean Intellectual Property Office, the contents of which are incorporated herein in their entirety by reference.

1. Field of the Invention

The present invention relates to a parameter generating circuit and a method of generating a parameter, and more particularly, to a parameter generating circuit for deciding a priority of master blocks in a system bus, the master blocks transmitting data through the system bus, and a method of generating a parameter for the same.

2. Description of the Related Art

As integrated systems in chips become larger, the number of master blocks included in the chips increases. Thus, there have been many studies on effective ways to occupy and connect a system bus.

A chip, in which a plurality of blocks are integrated, has various functions and is widely used in various fields. Accordingly, it is necessary to apply a different arbitration priority between blocks and master blocks in the chip according to the field of use.

Thus, a conventional arbitration scheme using a fixed priority has been developed such that a rotating priority and a round-robin priority are introduced. Recently, a programmable fixed priority, which allows a priority to be flexibly programmed according to each master block, has been suggested to provide an effective arbitration scheme suitable for an application field where master blocks are used.

However, in a chip to which the programmable fixed priority is applied, since an appropriate priority is decided by testing the chip through trial and error and there are various master blocks even in the chip specific for one field, data are transferred smoothly in a certain master block, but they are not smoothly transferred in another master block.

In this case, overall efficiency of the bus is reduced due to starvation in a specific master block though an appropriate priority is decided.

FIG. 1 is a block diagram of a general system-on-chip SOC.

Referring to FIG. 1, a general system-on-chip SOC 100 includes a plurality of master blocks 120 to 170 and a slave block 180. The SOC 100 further includes a system bus arbitrator 190 that arbitrates occupations of a system bus 110 between the master blocks 120 to 170.

In FIG. 1, a general direct memory access (GDMA) 150, a peripheral component interconnect (PCI) host 140, a universal serial bus (USB) host 170, an Ethernet media access control (Ethernet MAC) 120, a segmentation and reassembly (SAR) 160, and a central processing unit (CPU) 130 present the master blocks, and a memory controller 180 presents the slave block.

The master blocks 120 to 170 output a request signal, which indicates that the system bus 110 is needed for data transfer, to the system bus arbitrator 190. After the system bus arbitrator 190 completes the arbitration, the master blocks 120 to 170 obtain occupations of the system bus 110 upon receipt of a grant signal from the system bus arbitrator 190.

In general, since only one system bus 110 is included in the SOC 100, only one master block can occupy the system bus 110. If a plurality of master blocks 120 to 170 are connected to the system bus 110, each master block outputs the request signal in order to occupy the system bus 110, and the system arbitrator 190 outputs the grant signal according to a priority of the master blocks 120 to 170 to allow occupation of the system bus 110.

At this time, the master blocks, which are mainly used in the SOC 100, change according to an application field of the SOC 100, and the arbitration scheme of the system bus arbitrator 190 is important for effective occupations of the system bus 110 in each application field.

Therefore, the system bus arbitrator 190, which can program and control the priority or an occupation value of the system bus, will be effective for the system bus 110.

Although the system bus arbitrator 190 can program and control the priority or occupations of the system bus, the system bus 110 cannot effectively operate without the appropriate priority or the occupation value. The appropriate priority or the occupation value is obtained by trial and error in a real test, but still, it does not guarantee the effective operation of the system bus 110.

For example, when the SOC 110 of FIG. 1 is used in a home gateway, data transfer of the USB host 170 may increase, or data transfer of the USB host 170 may decrease and those of the PCI host 140 or the SAR 160 may increase at times.

Accordingly, although the SOC 100 is applied to one application field, the master block, which requests data transfer, may be different according to the data transfer environment. Therefore, a preset priority or occupation value programmed by the system bus arbitrator 190 cannot provide an optimal system bus environment when the data transfer environment is changed.

SUMMARY OF THE INVENTION

The present invention provides a real-time based parameter generating circuit capable of providing a parameter on the basis of which a system bus arbitrator programs a priority and an occupation of the system bus.

The present invention also provides a method of generating a parameter on the basis of which a system bus arbitrator programs a priority and an occupation of the system bus.

According to an aspect of the present invention, there is provided an arbitration parameter generating circuit comprising a counter, a short term arbitration parameter storage unit, a short term reference time measurement unit, a long term arbitration parameter control unit, and a long term reference time measurement unit. The counter receives a request signal generated in order for a master block to occupy a system bus and a grant signal generated in order for an arbitrator to allow the master block to occupy the system bus, up-counts when the request signal is at a first logic level, down-counts when the grant signal is at the first logic level, and is reset in response to a predetermined short term reference time signal.

The short term arbitration parameter storage unit receives and stores the counted signal as the short term arbitration parameter until the counter is reset in response to the short term reference time signal.

The short term reference time measurement unit generates the short term reference time signal in response to the clock signal whenever the short term reference time is over, in which the short term reference time indicates a time period for which the short term arbitration parameter is stored in the short term arbitration parameter storage unit.

The long term arbitration parameter control unit continuously accumulates the short term arbitration parameter outputted from the short term arbitration parameter storage unit, outputs the accumulated short term arbitration parameter as a long term arbitration parameter, and is reset in response to the long term reference time signal.

The long term reference time measurement unit generates the long term reference time signal in response to the short term reference time signal whenever the long term reference time is over.

In one embodiment, the long term arbitration parameter control unit comprises an adder, a register, and a long term arbitration storage unit. The adder continuously accumulates the short term arbitration parameter outputted from the short term arbitration parameter storage unit. The register stores output of the adder and is reset in response to the long term reference time signal. The long term arbitration storage unit stores output of the register as the long term arbitration parameter in response to the long term reference time signal.

In one embodiment, the long term reference time measurement unit comprises a long term counter and a long term comparing unit. The long term counter counts the number of generations of the short term reference time signal and is reset in response to the long term reference time signal. The long term comparing unit previously stores the time when the long term arbitration parameter is stored in the long term arbitration parameter storage unit as the long term reference time, and generates the long term reference time signal when output of the long term counter reaches the long term reference time.

The long term reference time signal can be generated at or before every $2^{n-p}$ times of the time when the short term reference time signal is generated, in which n denotes a bit width of the adder, and p denotes the number of bits of the short term arbitration parameter outputted from the short term arbitration parameter storage unit.

The short term reference time measurement unit can include a short term counter and a short term comparing unit. The short term counter counts the clock signal and is reset in response to the short term reference time signal. The short term comparing unit previously stores the time when the short term arbitration parameter is stored in the short term arbitration parameter storage unit as a short term reference time and generates the short term reference time signal when output of the short term counter reaches the short term reference time.

The short term reference time signal can be generated at or before every $2^m$ times of a period of the clock signal, in which m denotes a bit width of the short term counter.

The short term arbitration parameter can be calculated by subtracting the number of generations of the grant signal at the first logic level from the number of generations of the request signal at the first logic level.

In one embodiment, the short term arbitration parameter is only the upper p bits selected from output of the counter.

According to another aspect of the present invention, there is provided a bus using parameter generating circuit comprising a counter, a short term bus using parameter storage unit, a short term reference time measurement unit, a long term bus using parameter control unit, and a long term reference time measurement unit. The counter up-counts data in response to a clock signal, while the data is transferred via a system bus, and is reset in response to a predetermined short term reference time signal. The short term bus using parameter storage unit receives and stores up-counted data as a short term bus using parameter until the counter is reset in response to the short term reference time signal. The short term reference time measurement unit generates the short term reference time signal whenever the short term reference time is over, the short term reference time indicating a time period for which the short term bus using parameter is stored in the short term bus using parameter storage unit. The long term bus using parameter control unit continuously accumulates the short term bus using parameter outputted from the short term bus using parameter storage unit for a predetermined time, outputs the accumulated short term bus using parameter as a long term bus using parameter and is reset in response to a predetermined long term reference time signal. The long term reference time measurement unit generates the long term reference time signal in response to the short term reference time signal whenever the long term reference time is over.

In one embodiment, the long term bus using parameter control unit comprises an adder, a register, and a long term bus using parameter storage unit. The adder continuously accumulates the short term bus using parameter outputted from the short term bus using parameter storage unit. The register stores output of the adder and is reset in response to the long term reference time signal. The long term bus using parameter storage unit stores output of the register as the long term bus using parameter in response to the long term reference time signal.

The long term reference time measurement unit can include a long term counter and a long term comparing unit. The long term counter counts the number of generations of the short term reference time signal and is reset in response to the long term reference time signal. The long term comparing unit previously stores the time when the long term arbitration parameter is stored in the long term arbitration parameter storage unit as the long term reference time, and generates the long term reference time signal when output of the long term counter reaches the long term reference time.

In one embodiment, the long term reference time signal is generated at or before every $2^{n-p}$ times of the time when the short term reference time signal is generated, in which n denotes a bit width of the adder, and p denotes the number of bits of the short term bus using parameter outputted from the short term bus using parameter storage unit.

The short term reference time measurement unit can include a short term counter and a short term comparing unit. The short term counter counts the clock signal and is reset in response to the short term reference time signal. The short term comparing unit previously stores the time when the short term arbitration parameter is stored in the short term arbitration parameter storage unit as a short term reference time and generates the short term reference time signal when output of the short term counter reaches the short term reference time.

The short term reference time signal can be generated at or before every $2^m$ times of a period of the clock signal, in which m denotes a bit width of the short term counter.

In one embodiment, the short term bus using parameter is equal to the number of data transfers via the system bus.

In one embodiment, the short term bus using parameter is only the upper p bits selected from output of the counter.

According to yet another aspect of the present invention, there is provided a system on chip including a system bus, first through $n^{th}$ master blocks that transfer data via the system bus, and an arbitrator that controls occupation of the system bus by the master blocks. The system on chip comprises a bus using parameter control circuit, a short term reference time measurement unit, and a long term reference time measurement unit.

The bus using parameter control circuit measures the number of data transfers via the system bus for a predetermined short term reference time in response to a predetermined short term reference time signal, generates the measured number as a short term bus using parameter, and generates a short term bus using parameter, which is accumulated during a predetermined time, as a long term bus using parameter in response to a predetermined long term bus using parameter signal.

The short term reference time measurement unit generates the short term reference time signal in response to a clock signal whenever the short term reference time is over.

The long term reference time measurement unit generates the long term reference time signal in response to the short term reference time signal whenever a predetermined long term reference time is over.

Each of the first through $n^{th}$ master blocks includes an arbitration parameter control circuit which receives a request signal generated for the master blocks to occupy the system bus and a grant signal generated for the arbitrator to allow the master blocks to occupy the system bus, counts the number of generations of the request signals and the grant signals at a first logic level in response to the short term reference time signal, generates a short term arbitration parameter, continuously accumulates the short term arbitration parameter for a predetermined time in response to the long term reference time signal and generates the accumulated short term arbitration parameter as a long term arbitration parameter.

In one embodiment, the bus using parameter control circuit comprises a bus counter, a short term bus using parameter storage unit, and a long term bus using parameter control unit. The bus counter up-counts the data in response to the clock signal, while the data are transferred via the system bus, and is reset in response to the short term reference time signal. The short term bus using parameter storage unit receives and stores the up-counted data as the short term bus using parameter in response to the short term reference time signal until the bus counter is reset. The long term bus using parameter control unit continuously accumulates the short term bus using parameter outputted from the short term bus using parameter storage unit during a predetermined time, outputs the accumulated short term bus using parameter as the long term bus using parameter, and is reset in response to a predetermined long term reference time signal.

In one embodiment, the long term bus using parameter control unit comprises a bus adder, a bus register, and a long term bus using parameter storage unit. The bus adder continuously accumulates the short term bus using parameter outputted from the short term bus using parameter storage unit. The bus register stores output of the adder and is reset in response to the long term reference time signal. The long term bus using parameter storage unit stores output of the register as the long term bus using parameter in response to the long term reference time signal.

In one embodiment, the arbitration parameter control circuit comprises a counter, a short term arbitration parameter storage unit, and a long term arbitration parameter control unit. The counter receives the request signal and the grant signal, up-counts when the request signal is at a first logic level, and down-counts when the grant signal is at the first logic level, and is reset in response to a predetermined short-time reference time signal. The short term arbitration parameter storage unit receives and stores the counted signals as a short term arbitration parameter in response to the short term reference time signal until the counter is reset.

The long term arbitration parameter control unit continuously accumulates the short term arbitration parameter outputted from the short term arbitration parameter storage unit, outputs the accumulated short term arbitration parameter as a long term arbitration parameter and is reset in response to a predetermined long term reference time signal.

In one embodiment, the long term arbitration parameter control unit comprises an adder, a register, and a long term arbitration storage unit. The adder continuously accumulates the short term arbitration parameter outputted from the short term arbitration parameter. The register stores output of the adder and is reset in response to the long term reference time signal. The long term arbitration storage unit stores output of the register as the long term arbitration parameter in response to the long term reference time signal.

According to yet another aspect of the present invention, there is provided a method of generating an arbitration parameter which decides priority of master blocks transferring data via a system bus. The method comprises (a) generating a short term reference time signal which decides the time when storing a predetermined short term arbitration parameter in response to a clock signal; (b) receiving a request signal generated for the master blocks to occupy the system bus and a grant signal generated for the arbitrator to allow the master blocks to occupy the system bus and generating a short term arbitration parameter in response to the short term reference time signal; (c) generating a long term reference time signal which decides the time when storing a predetermined long term arbitration parameter in response to the short term reference time signal; and (d) continuously accumulating the short term arbitration parameter for a predetermined time in response to the long term reference time signal and outputting the accumulated short term arbitration parameter as a long term arbitration parameter.

In one embodiment, step (b) further comprises (b1) up-counting when the request signal is at the first logic level, down-counting when the grant signal is at the first logic level and outputting the counted value as a short term arbitration parameter; and (b2) resetting the counted signal in response to the short term reference time signal and counting the request signal and the grant signal according their logic level.

The short term arbitration parameter can be calculated by subtracting the number of generations of the grant signal at the first logic level from the number of generations of the request signal at the first logic level.

In one embodiment, step (d) further comprises (d1) continuously accumulating the short term arbitration parameter and outputting the accumulated short term arbitration parameter as the long term arbitration parameter; and (d2) resetting the accumulated short term arbitration parameter in response to the long term reference time signal, continuously accumulating the short term arbitration parameter and outputting the accumulated short term arbitration parameter as the long term arbitration parameter.

In one embodiment, the short term reference time signal is generated at a shorter interval than the long term reference time signal.

According to yet another aspect of the present invention, there is provided a method of generating a bus using parameter which decides priority of master blocks transferring data via a system bus. The method comprises (a) generating a short term reference time signal which decides a time to store a predetermined short term bus using parameter in response to a clock signal; (b) up-counting data in response to the clock signal and the short term reference time signal whenever the data are transferred via the system bus and outputting the counted data as the short term bus using parameter; (c) generating a long term reference time signal which decides a time to accumulate the short term bus using parameter in response to the short term reference time signal; and (d) continuously accumulating the short term bus using parameter for a predetermined time in response to the long term reference time signal and outputting the accumulated short term bus using parameter as a long term bus using parameter.

In one embodiment, step (b) further comprises (b1) up-counting data in response to the clock signal while the data are transferred via the system bus and outputting the counted data as the short term bus using parameter; and (b2) resetting the counted data in response to the short term reference time signal, and up-counting reset data in response to the clock signal while the data are transferred via the system bus and outputting the counted data as the short term bus using parameter.

In one embodiment, the short term bus using parameter is the number of data transfers via the system bus.

In one embodiment, step (d) further comprises (d1) continuously accumulating the short term bus using parameter and outputting the accumulated short term bus using parameter as a long term bus using parameter; and (d2) resetting the accumulated short term bus using parameter in response to the long term reference time signal, and continuously accumulating the reset short term bus using parameter and outputting the accumulated short term bus using parameter as a long term bus using parameter.

In one embodiment, the short term reference time signal is generated at a shorter interval than the long term reference time signal.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
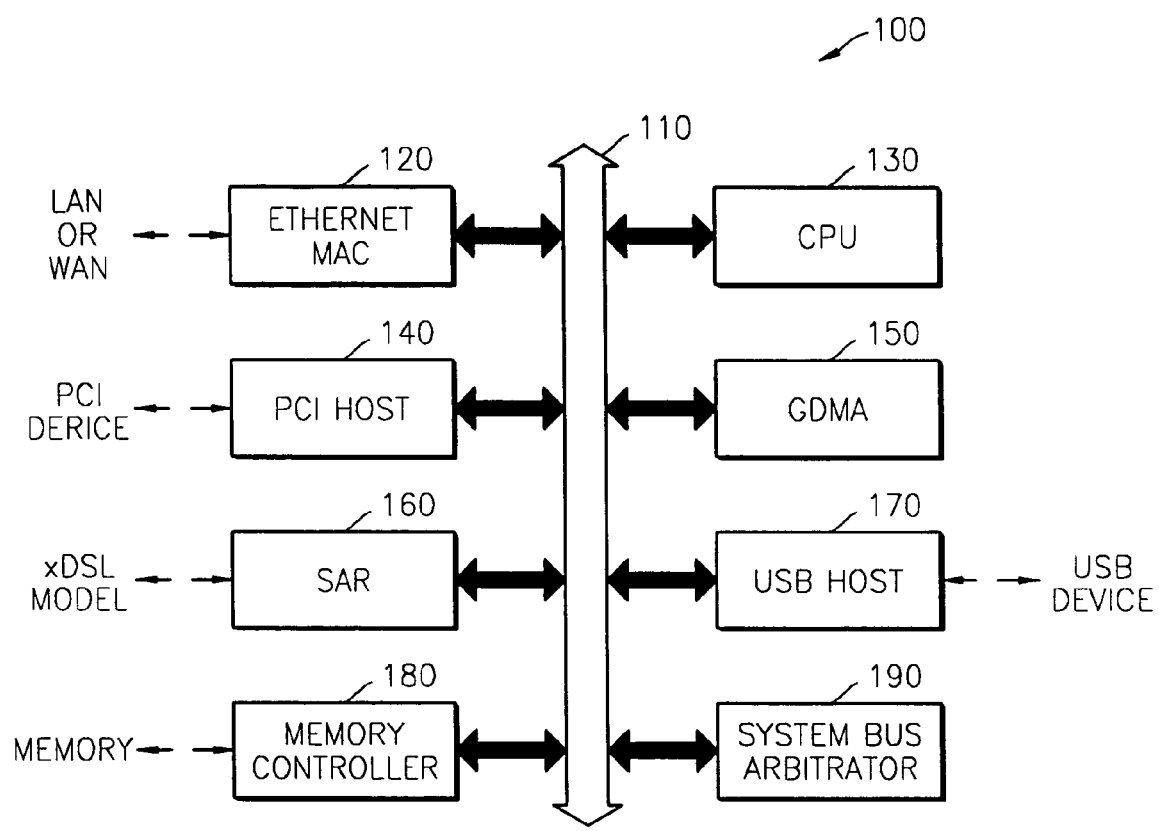
FIG. 1 is a block diagram of a general system-on-chip SOC.
Figure 2:
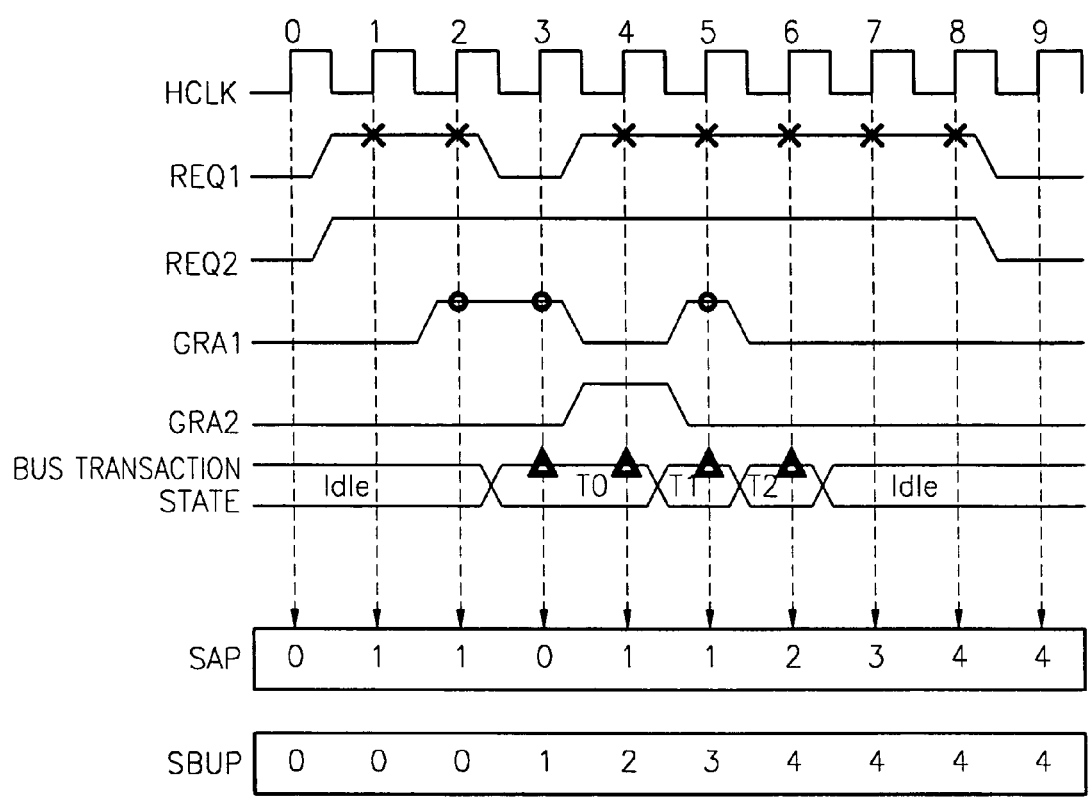
FIG. 2 is a timing diagram illustrating the generation of a short term arbitration parameter and a short term bus using the arbitration parameter.

FIG. 2 is a timing diagram illustrating the generation of a short term arbitration parameter and a short term bus using the arbitration parameter. FIG. 2 will be described with reference to an arbitration parameter generating circuit 300 of FIG. 3.

Figure 3:
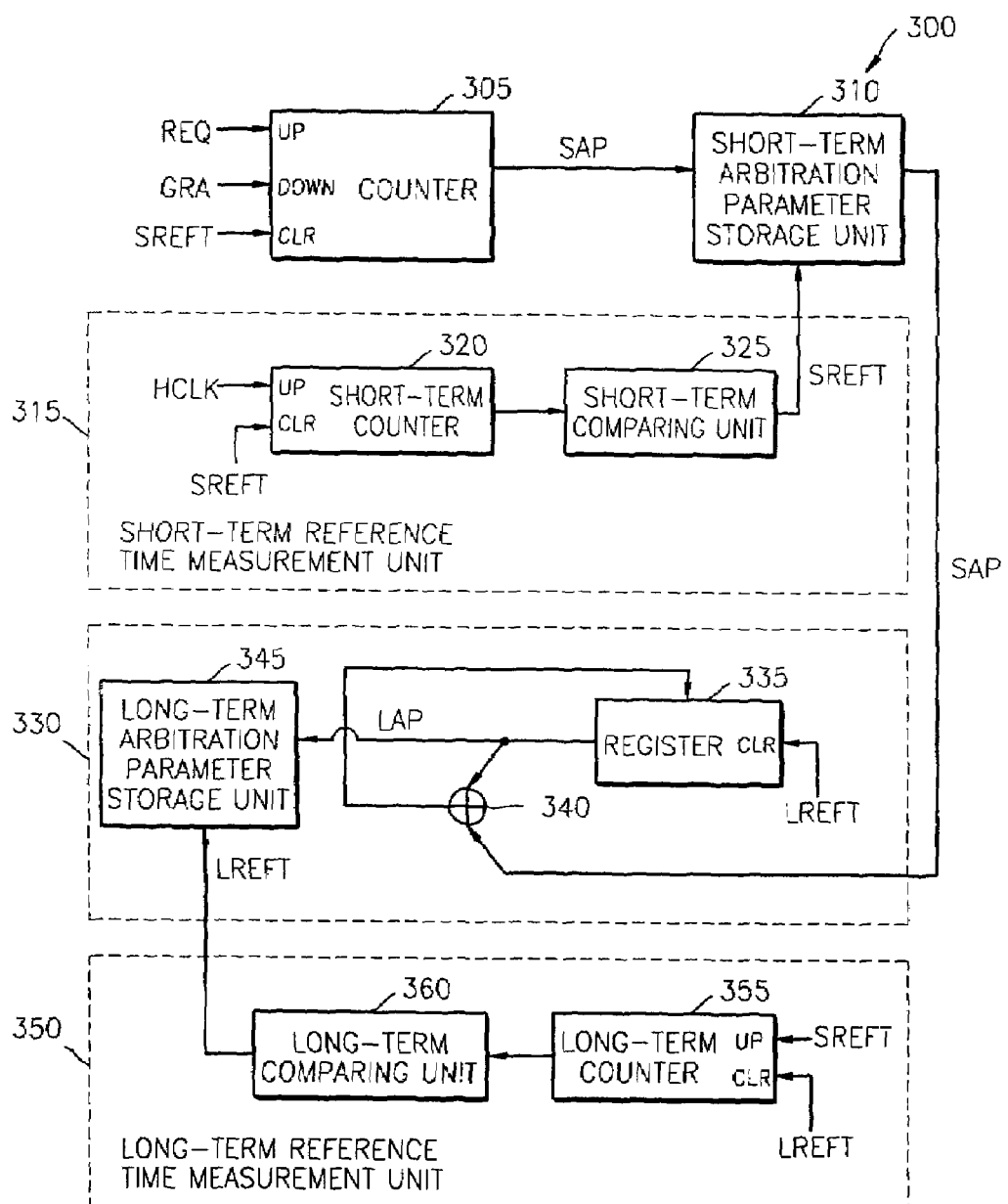
FIG. 3 is a block diagram of an arbitration parameter generating circuit according to a first embodiment of the present invention.

FIG. 3 is a block diagram of an arbitration parameter generating circuit according to a first embodiment of the present invention.

Referring to FIG. 3, the arbitration parameter generating circuit 300 includes a counter 305, a short term arbitration parameter storage unit 310, a short term reference time measurement unit 315, a long term arbitration parameter control unit 330, and a long term reference time measurement unit 350.

Figure 7:
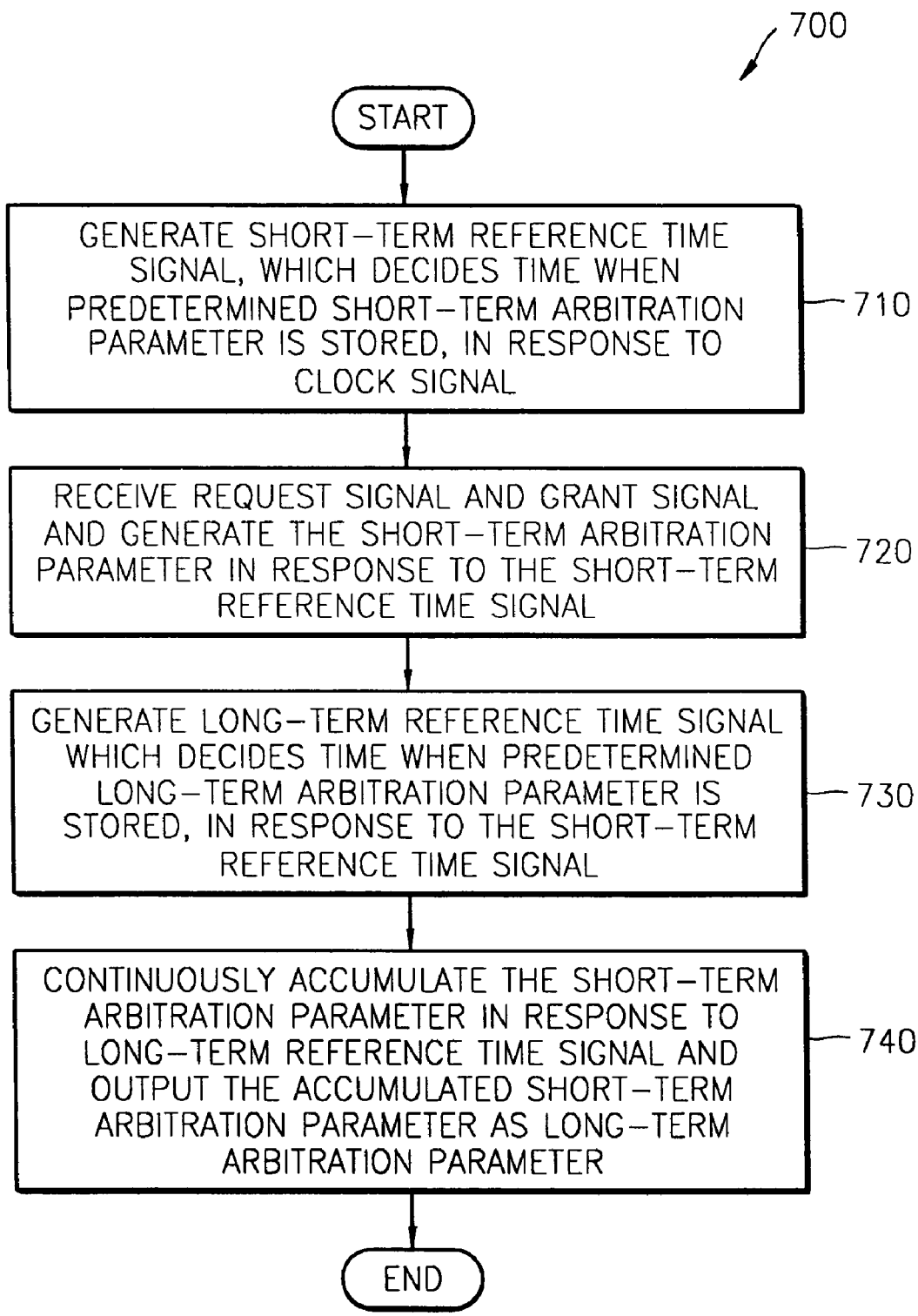
FIG. 7 is a flowchart showing a method of generating an arbitration parameter according to the first embodiment of the present invention.
Figure 8:
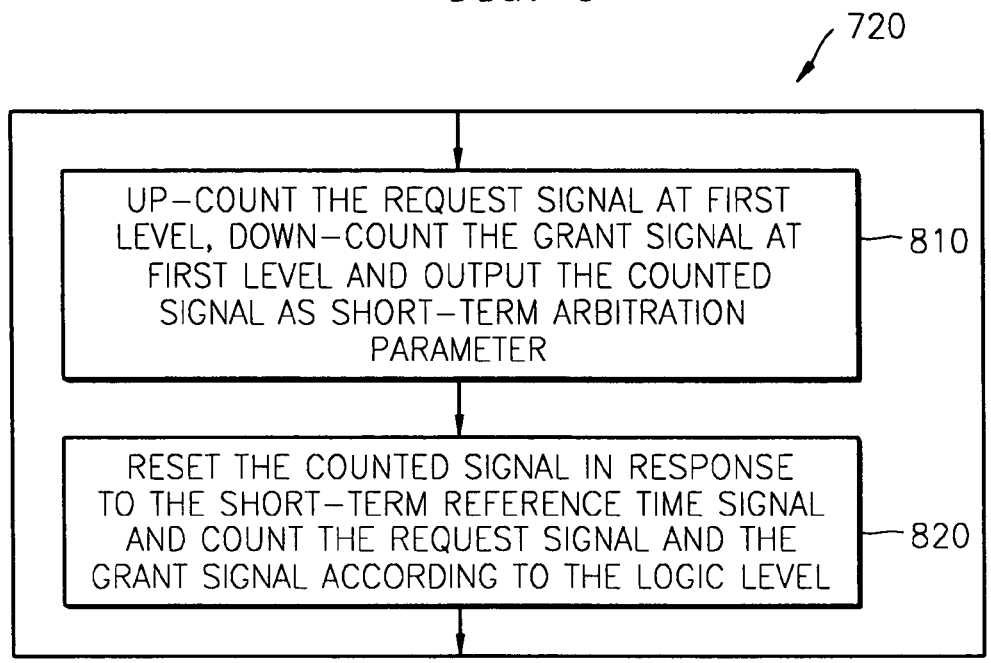
FIG. 8 is a detailed view of step 720 of FIG. 7.
Figure 9:
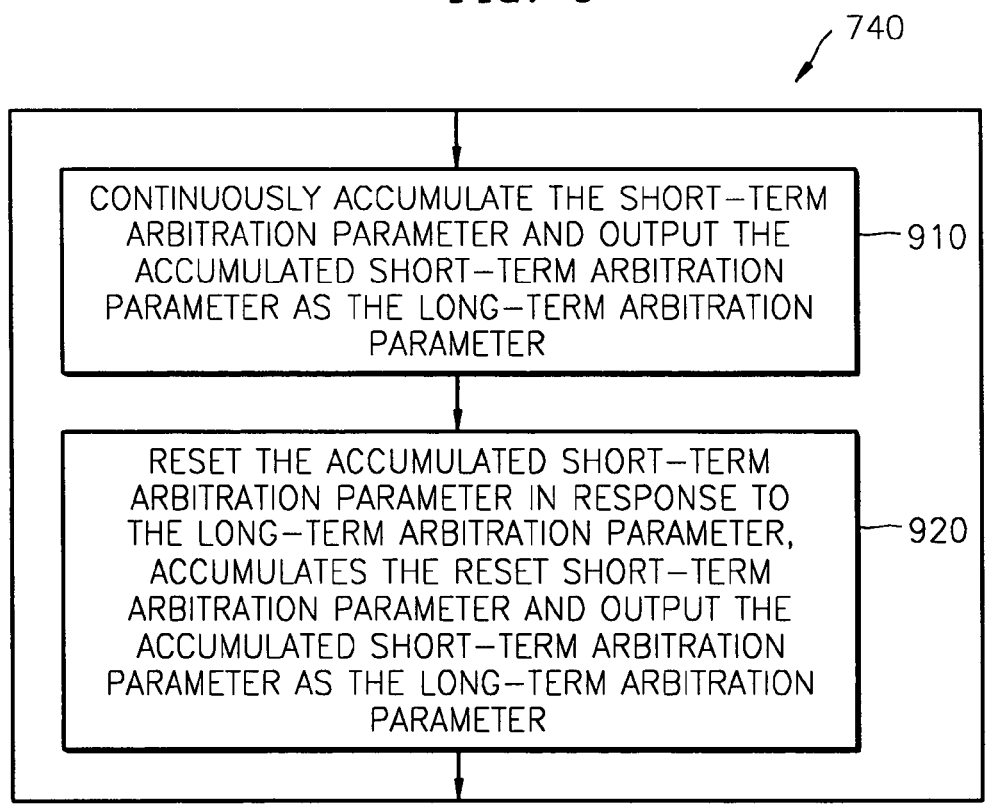
FIG. 9 is a detailed view of step 740 of FIG. 7.

The operation of the arbitration parameter generating circuit 300 of FIG. 3 will be described with a method of generating the arbitration parameter presented in FIGS. 7 through 9, wherein FIG. 7 is a flowchart showing a method of generating an arbitration parameter according to the first embodiment of the present invention, FIG. 8 is a detailed view of step 720 of FIG. 7, and FIG. 9 is a detailed view of step 740 of FIG. 7.

A short term reference time signal, which determines time for storing a short term arbitration parameter, is generated in response to a clock signal (step 710).

The short term reference time measurement unit 315 generates a short term reference time signal SREFT in response to a clock signal HCLK whenever a short term reference time is over. The short term reference time indicates a time period for which a short term arbitration parameter SAP is stored in the short term arbitration parameter storage unit 310.

The clock signal HCLK is a system clock of a SOC on which the arbitration parameter generating circuit 300 is mounted.

A request signal for occupying the system bus and a grant signal for allowing the occupation of the system bus are received, and the short term arbitration parameter is generated in response to the short term reference time signal (step 720).

More specifically, step 720 includes up-counting the request signal at a first logic level, down-counting the grant signal at the first logic level, and outputting the counted signal as the short term arbitration parameter (step 810), and resetting the counted signal in response to the short term reference time signal and counting the request signal and the grant signal according to their logic level (step 820).

The counter 305 and the short term arbitration parameter storage unit 310 of FIG. 3 perform step 720. The counter 305 receives a request signal REQ, which is generated so that the master block can occupy the system bus, and a grant signal GRA, which is generated such that the system bus arbitrator allows the master block to occupy the system bus. The counter 305 up-counts when the request signal REQ is at the first logic level, down-counts when the grant signal GRA is at the first level, and is reset in response to the short term reference time signal SREFT.

Here, the first logic level may be a high logic level or a low logic level. However, it is assumed that the first logic level is the high logic level in this description.

The short term arbitration parameter storage unit 310 receives and stores the counted value, which is counted before the counter 305 is reset in response to the short term reference time signal SREFT, as the short term arbitration parameter SAP. The short term arbitration parameter storage unit 310 receives and stores outputs of the counter 305 when the short term reference time signal SREFT is generated. The counter 305 provides the counted value, which is counted before the short term reference time signal SREFT is generated, to the short term arbitration parameter storage unit 310 and is reset if the short term reference time signal SREFT is generated.

Operation will be described in more detail with reference to FIG. 2.

The arbitration parameter generating circuit 300 generates the arbitration parameter in accordance with the request signal REQ and the grant signal GRA, is used where the system bus arbitrator programs the priority or the occupation value, and thus allows the effective operation of the system bus.

In FIG. 2, there are two master blocks in the SOC. A first master block generates a request signal REQ1, and a second master block generates a request signal REQ2. The first master block receives a grant signal GRA1, and the second master block receives a grant signal GRA2.

The first master block outputs the request signal REQ1 for occupying the system bus between the first and the second clock signals HCLK and between the fourth through the eighth clock signals HCLK. If the request signal REQ1 is at a logic high level, the request signal REQ1 is assumed to be generated.

The first master block receives the grant signal GRA1 from the system bus arbitrator between the second and the third clock signals HCLK and at the fifth clock signal and performs data transaction of T0 and T2 by using the system bus one clock later than the grant signal GRA1.

The counter 305 up-counts by 1 while the first master block generates the request signal REQ1 in response to a rising edge of the clock signal HCLK and down-counts by 1 while the first master block generates the grant signal GRA1 in response to the rising edge of the clock signal HCLK, and thus the counter 305 generates the short term arbitration parameter SAP.

That is, the short term arbitration parameter SAP is calculated by subtracting the number of the grant signal GRA at the logic high level from the number of the request signal REQ at the logic high level.

While the first master block generates the request signal REQ between the first and the second clock signals HCLK and receives the grant signal GRA between the second and the third clock signals HCLK, the short term arbitration parameter SAP is "1+(1−1)−1=0." While the first master block generates the request signal REQ between the fourth and the eighth clock signals HCLK and receives the grant signals GRA at the fifth clock signal HCLK, the short term arbitration parameter SAP is "1+(1−1)+ 1+1+=4," and thus the short term arbitration parameter SAP becomes 4 at the ninth clock signal HCLK.

Here, the short term arbitration parameter SAP indicates an accumulated value of a clock signal HCLK that waits for receiving the grant signal GRA so that the master block can perform data transfer by using the system bus. After the short term arbitration parameter SAP is calculated for a predetermined time, i.e., the short term reference time, and the calculated short term arbitration parameter SAP is stored in the short term parameter storage unit 310, it can be determined which master block waits for the grant signal GRA for a longer time during a predetermined period of time.

Therefore, it is possible to find the master block which needs more grant signal GRA considering the priority or the occupation value of the system bus arbitrator (that is, the master block of which the priority or the occupation value is relatively low considering the amount of data to be transferred) by comparing the short term arbitration parameter SAP between the master blocks. Since the short term arbitration parameter SAP is calculated for each master block, a plurality of short term arbitration parameter storage units 310 are needed for storing the short term arbitration parameter SAP for each master block.

Figure 4:
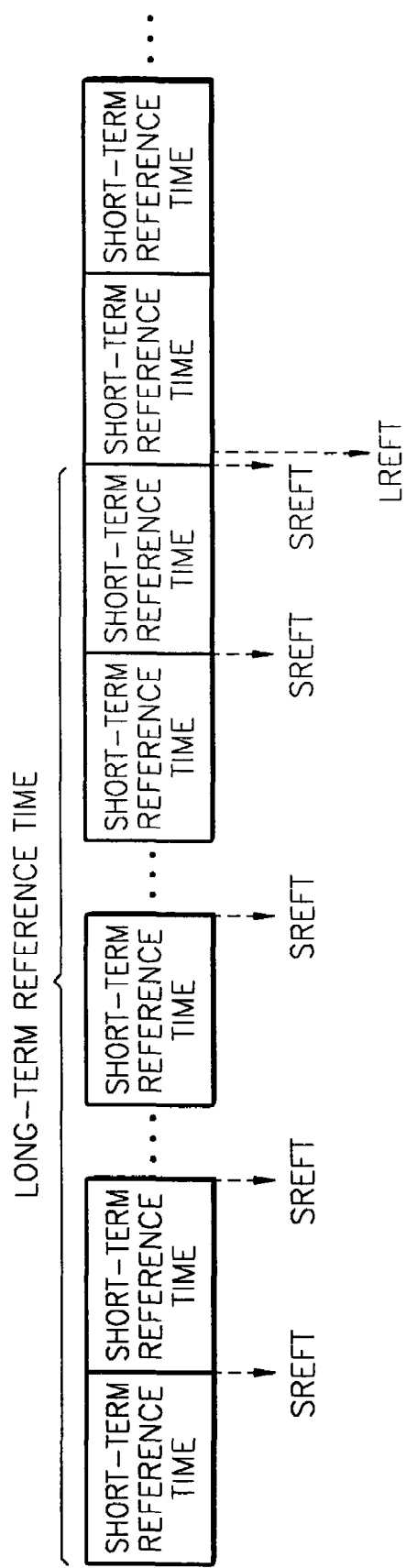
FIG. 4 is a diagram illustating a short term reference time and a long term reference time.

FIG. 4 is a view for explaining a short term reference time and a long term reference time.

The short term reference time represents a time when the short term arbitration parameter SAP is generated from the counter 305, length of the short term reference time is determined by a bit width of a short term counter 320 of the short term reference time measurement unit 315.

That is, whenever the short term reference time is over, the short term reference time signal SREFT is generated. The short term reference time signal SREFT is generated at or before every $2^m$ times of a period of the clock signal HCLK. Here, "m" denotes a bit width of the short term counter 320. That is, the short term reference time signal SREFT is generated at every maximum $2^m$ times of a period of the clock signal HCLK.

For example, if the period of the clock signal HCLK is 7.5 ns and the short term counter 320 is used, the short term reference time lasts 32.2 seconds. Here, the result of calculating the short term arbitration parameter SAP during the short term reference time is 32-bit which is stored in the short term arbitration parameter storage unit 310 at the time indicated by the short term reference time signal SREFT of FIG. 4. Only the upper p-bit of the short term arbitration parameter SAP can be selected from outputs of the counter 305 and be stored in the short term arbitration parameter storage unit 310, so as to reduce the size of the short term arbitration parameter storage unit 310. Although only the upper p-bit of the short term arbitration parameter SAP is stored as the short term arbitration parameter in the short term arbitration parameter storage unit 310, error rate is very small.

The short term reference time measurement unit 315 includes a short term comparing unit 325 which counts the clock signal HCLK, previously stores the time when the short term counter 320 and the short term arbitration parameter SAP are stored in response to the short term reference time signal SREFT as a short term reference time, and generates the short term reference time signal SREFT when the output of the short term counter 320 reaches the short term reference time.

That is, information on the short term reference time is stored in the short term comparing unit 325, and the short term comparing unit 325 compares the output of the short term counter 320 with the information on the short term reference time and generates the short term reference time signal SREFT if the short term reference time is over. Therefore, the time when the short term reference time signal SREFT can be adjusted by changing the information on the short term reference time stored in the short term comparing unit 325. The short term counter 320 is reset in response to the short term reference time signal SREFT.

The priority or the occupation value of a system bus arbitrator is previously adjusted by using the short term parameter SAP which is generated during the first short term reference time of FIG. 4 and then the short term arbitration parameter SAP can be obtained during the second short term reference time.

Therefore, by using the short term arbitration parameter SAP, the system bus arbitrator can respond quickly to the requests for data transfer of the master blocks which are rapidly changed during a short time and manage changes of the system bus' environment by adjusting the priority or the occupation value.

If the priority or the occupation value of the system bus arbitrator, which is adjusted by the short term arbitration parameter generated during the first short term reference time, is applied to the SOC, an effective system bus arbitration scheme suitable for the changed environment of the system bus can be provided during the second short term reference time.

The long term reference time signal, which decides the time when the short term arbitration parameter is accumulated, is generated in response to the short term reference time signal (step 730). In response to the long term reference time signal, the short term arbitration parameter is continuously accumulated during a predetermined time and then the accumulated short term arbitration parameter is outputted as a long term arbitration parameter (step 740).

More particularly, step 740 includes continuously accumulating the short term arbitration parameter and outputting the accumulated short term arbitration parameter as the long term arbitration parameter (step 910), and resetting the accumulated short term arbitration parameter in response to the long-time reference time signal, accumulating the short term arbitration parameter and outputting the accumulated short term arbitration parameter as the long term arbitration parameter (step 920).

A long term arbitration parameter control unit 330 and a long term reference time measurement unit 350 perform steps 730 and 740, respectively.

The long term arbitration parameter control unit 330 continuously accumulates the short term arbitration parameter SAP, which is outputted from the short term arbitration parameter control unit 310, during a predetermined time, outputs the accumulated short term arbitration parameter SAP as a long term arbitration parameter LAP and is reset in response to the predetermined long term reference time signal LREFT.

More specifically, the long term parameter control unit 330 includes an adder 340 which continuously accumulates the short term arbitration parameter SAP outputted from the short term arbitration parameter storage unit 310, a register 335 which stores output of the adder 340 and is reset in response to the long term reference time signal LREFT, and a long term arbitration parameter storage unit 345 which stores output of the register 335 as the long term arbitration parameter LAP in response to the long term reference time signal LREFT.

The long term reference time measurement unit 350 generates the long term reference time signal LREFT in response to the short term reference time signal SREFT whenever a predetermined long term reference time is over.

More specifically, the long term reference time measurement unit 350 includes a long term counter 355 which counts the number of generations of the short term reference time signal SREFT, which is reset in response to the long term reference time signal LREFT, and a long term comparing unit 360 stores the time when the long term arbitration parameter LAP are stored in the long term arbitration parameter storage unit 345 as a long term reference time, and generates the long term reference time signal LREFT when an output of the long term counter 355 reaches the long term reference time.

The long term reference time signal LREFT is generated at or before every $2^{n-P}$ times of the time when the short term reference time signal SREFT is generated. Here, "n" denotes a bit width of the adder 340, and "p" denotes the number of bits of the short term arbitration parameter SAP which is outputted from the short term arbitration parameter storage unit 310. That is, the long term reference time signal LPEFT is generated at every maximum $2^{n-P}$ times of a period of the short term reference time signal SREFT.

The long term arbitration parameter LAP of FIG. 3 is produced by accumulating the short term arbitration parameter SAP, which is generated at every short term reference time, during the long term reference time that is much longer than the short term reference time.

Referring to FIG. 4, the long term reference time corresponds to a combination of several short term reference times, and the long term reference time signal LREFT is generated after the long term reference time is over.

For example, if the short term arbitration parameter SAP stored in the short term arbitration parameter storage unit 310 is the upper 8 bits of 32 bits, "p" is 8. Storing only the upper 8 bits of the short term arbitration parameter SAP is based on the same principle as normalization to $2^{24}$ times of the short term arbitration parameter SAP.

If the adder 340 of the upper 16 bits is used to obtain the long term arbitration parameter LAP, "n" is 16. Then, the short term arbitration parameter SAP can be accumulated during the $2^{n-P}$ times of the short term reference time, i.e., $2^8$ times of the short term reference time.

Therefore, if the period of the clock signal HCLK is 7.5 ns, the short term reference time is 32.2 seconds, and the long term reference time is 8243.2 seconds. That is, the long term counter 355 of the long term reference time measurement unit 350 can count $2^8$ numbers of inputs of the short term reference time signal SREFT, and the information on the long term reference time is stored in the long term comparing unit 360. The long term comparing unit 360 compares an output of the long term counter 355 with the information on the long term reference time and generates the long term reference time signal LREFT after the long term reference time is over. Thus, the time when the long term reference time signal LREFT is generated can be adjusted by changing the information on the long term reference time stored in the long term comparing unit 360. The long term counter 355 is reset in response to the long term reference time signal LREFT.

The short term arbitration parameter SAP is stored by the adder 340 in the register 335 during 8243.2 seconds, and the stored short term arbitration parameter SAP is stored in the long term arbitration parameter storage unit 345 as the long term arbitration parameter LAP when the long term reference time signal LREFT is generated. The register 335 is reset in response to the long term reference time signal LREFT.

Since the long term arbitration parameter LAP is obtained by accumulating the short term arbitration parameter SAP, it can present a general arbitration status in an application field of the SOC and decide the priority of the system bus arbitrator. In addition, the priority or the occupation value of the system bus arbitrator can be reasonably set based on general requests for data transfer of the master blocks.

Figure 5:
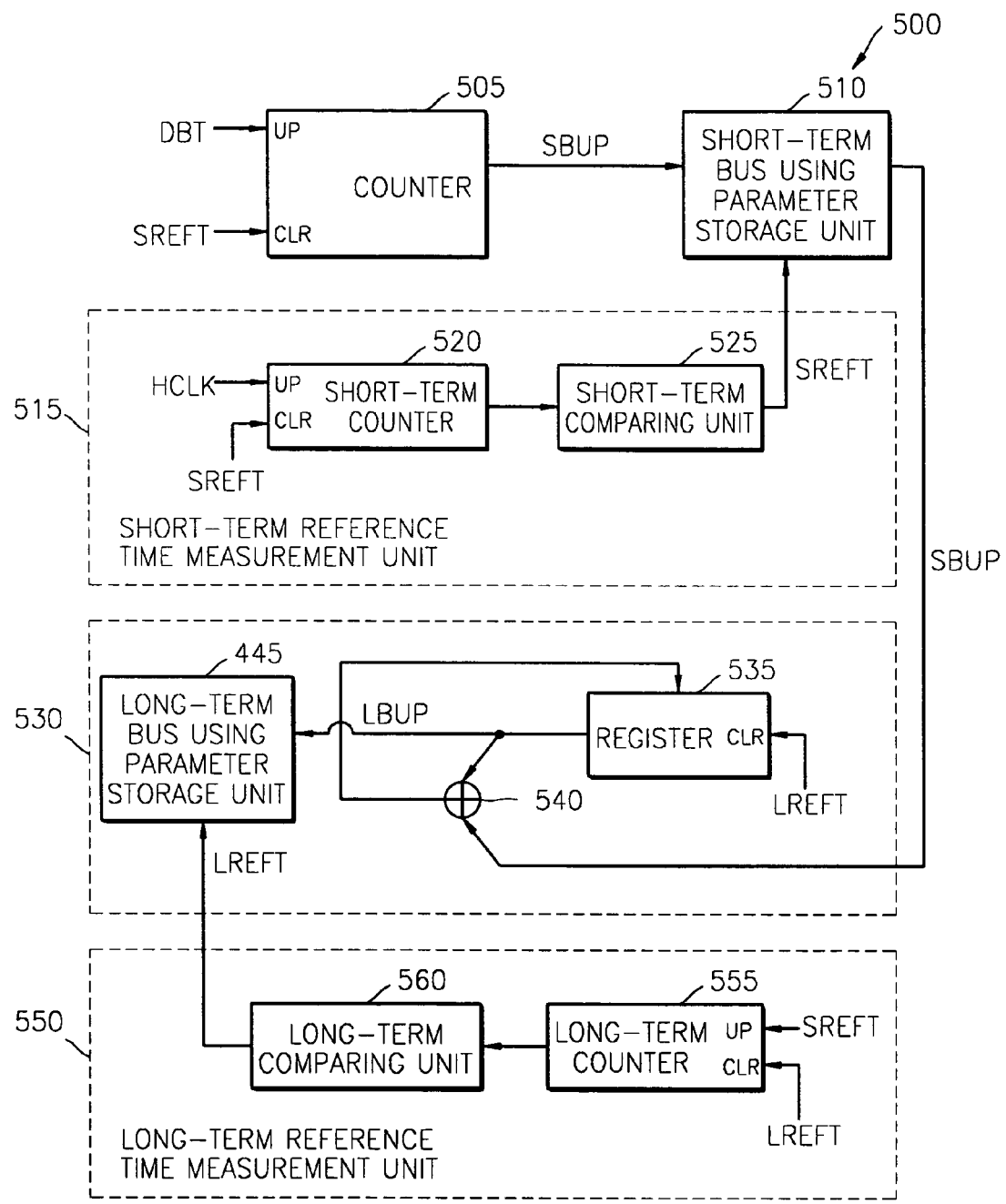
FIG. 5 is a block diagram of a bus using a parameter generating circuit according to a second embodiment of the present invention.

FIG. 5 is a block diagram of a bus using parameter generating circuit according to a second embodiment of the present invention.

The operation of a bus using parameter generating circuit 500 will be described with reference to a method of generating the bus using parameter illustrated in FIGS. 10 through 12.

Figure 10:
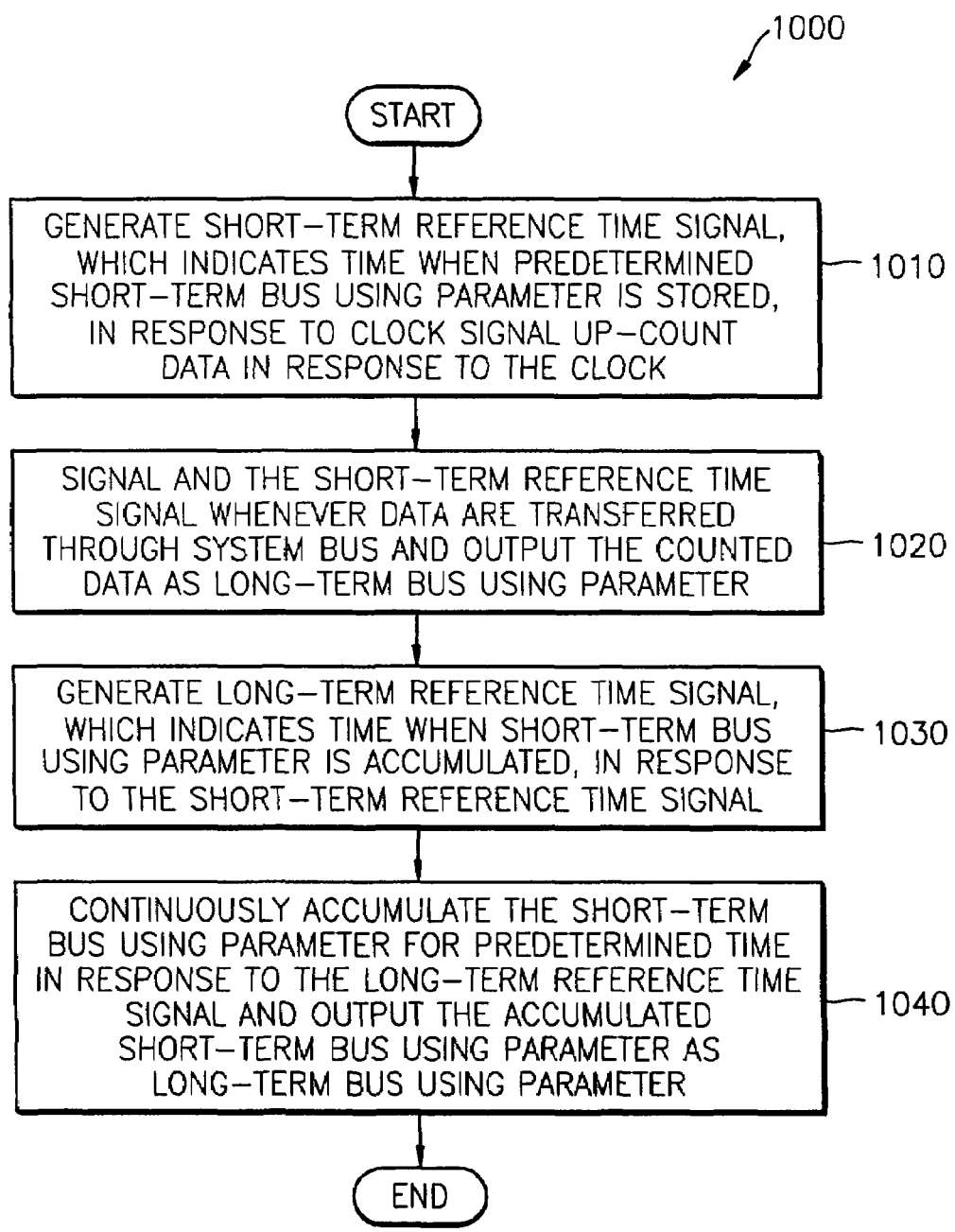
FIG. 10 is a flowchart showing a method of generating an arbitration parameter according to the second embodiment of the present invention.

FIG. 10 is a flowchart showing a method of generating an arbitration parameter according to the second embodiment of the present invention.

Figure 11:
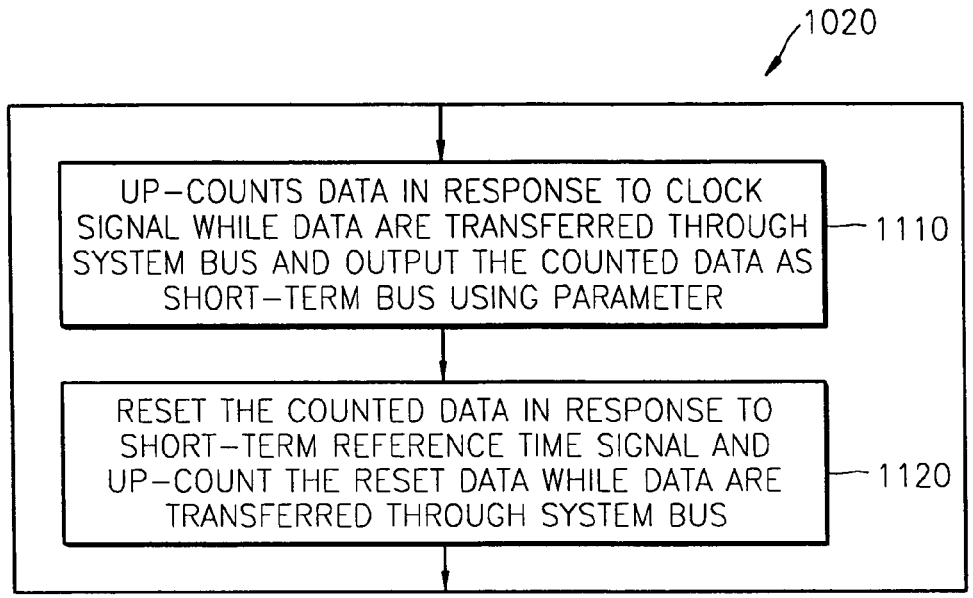
FIG. 11 is a detailed view of step 1020 of FIG. 10.

FIG. 11 is a detailed view of step 1020 of FIG. 10.

Figure 12:
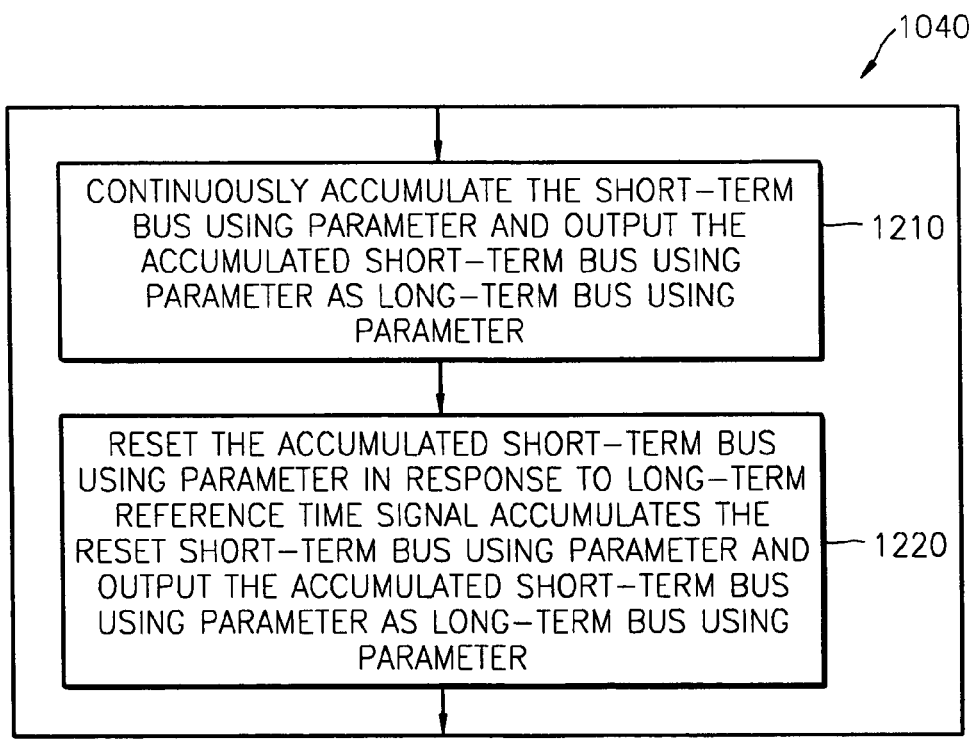
FIG. 12 is a detailed view of step 1040 of FIG. 10.

FIG. 12 is a detailed view of step 1040 of FIG. 10.

The short term reference time signal, which decides the time when a short term bus using parameter is stored, is generated in response to the clock signal (step 1010). Step 1010 describes the operation of a short term reference time measurement unit 515 of FIG. 5. The short term reference time measurement unit 515 has the same configuration as the short term reference time measurement unit 315 of FIG. 3 and operates in the same manner as the short term reference time measurement unit 315 of FIG. 3. Therefore, description of the short term reference time measurement unit 515 will not be repeated.

Data is up-counted in response to the clock signal and the short term reference time signal when the data are transferred through the system bus, and the up-counted data are outputted as the short term bus using parameter (step 1020).

More specifically, step 1020 includes up-counting data in response to the clock signal while the data are transferred through the system bus and outputting the up-counted data as the short term bus using parameter (step 1110), and resetting the up-counted data in response to the short term reference time signal and up-counting the reset data in response to the clock signal while the data are transferred through the system bus (step 1120).

A counter 505 and a short term bus using parameter storage unit 510 perform operations of step 1020 of FIG. 10.

The counter 505 up-counts data in response to the clock signal HCLK while the data are transferred through the system bus, and is reset in response to the short term reference time signal SREFT. The short term bus using parameter storage unit 510 receives and stores the data, which are counted before the counter 505 is reset, as the short term bus using parameter SBUP in response to the short term reference time signal SREFT.

T0 and T2 of FIG. 2 denote data transferring which the first master block performs by using the system bus, and T1 denotes data transferring which the second master block performs by using the system bus.

The short term bus using parameter SBUP can be calculated by adding each 1 of the third through sixth clock signals HCLK where the data transferring occurs. Therefore, the short term bus using parameter SBUP denotes total number of data transferring performed via the system bus.

Referring to FIG. 2, the short term bus using parameter SBUP is "1+1+1+1+=4" by adding each 1 of the third through sixth clock signals HCLK. Here, the short term bus using parameter SBUP denotes the number of data transferring performed via the system bus, and presents how effectively the system bus operates.

The greater the short term bus using parameter SBUP is, the more effectively the system bus operates. Therefore, a user of the SOC in which the bus using parameter generating unit 500 is included can know how effectively the system bus operates and which master block needs more system bus, by referring to the short term bus using parameter SBUP in real time.

The long term reference time signal, which decides the time when the short term bus using parameter is accumulated, is generated in response to the short term standard signal (step 1030). Operations of step 1030 are performed by the short term reference time measurement unit 515 of FIG. 5. The long term reference time measurement unit 550 of FIG. 5 has the same configuration as the long term reference time measurement unit 350 of FIG. 3, and therefore detailed description thereof will not be repeated.

The short term bus using parameter SBUP is continuously accumulated during a predetermined time in response to the long term reference time signal and the accumulated short term bus using parameter SBUP is outputted as a long term bus using parameter (step 1040).

Step 1040 includes continuously accumulating the short term bus using parameter and outputting the accumulated short term bus using parameter as the long term bus using parameter (step 1210), and resetting the accumulated short term bus using parameter in response to the long term reference time signal, accumulating the short term bus using parameter and outputting the accumulated short term bus using parameter as the long term bus using parameter (step 1220).

Step 1040 explains the operations of a long term bus using parameter control unit 530 of FIG. 5. The configuration and operation of the long term bus using parameter control unit 530 are similar with those of the long term arbitration control unit 330, and therefore detailed description thereof will not be repeated.

Since the long term bus using parameter LBUP is obtained by adding the short term bus using parameter SBUP, it can present a general arbitration status in an application field of the SOC and decide the priority of the system bus arbitrator. In addition, the priority or the occupation value of the system bus arbitrator can be reasonably set based on general requests for data transfer of the master blocks.

Figure 6:
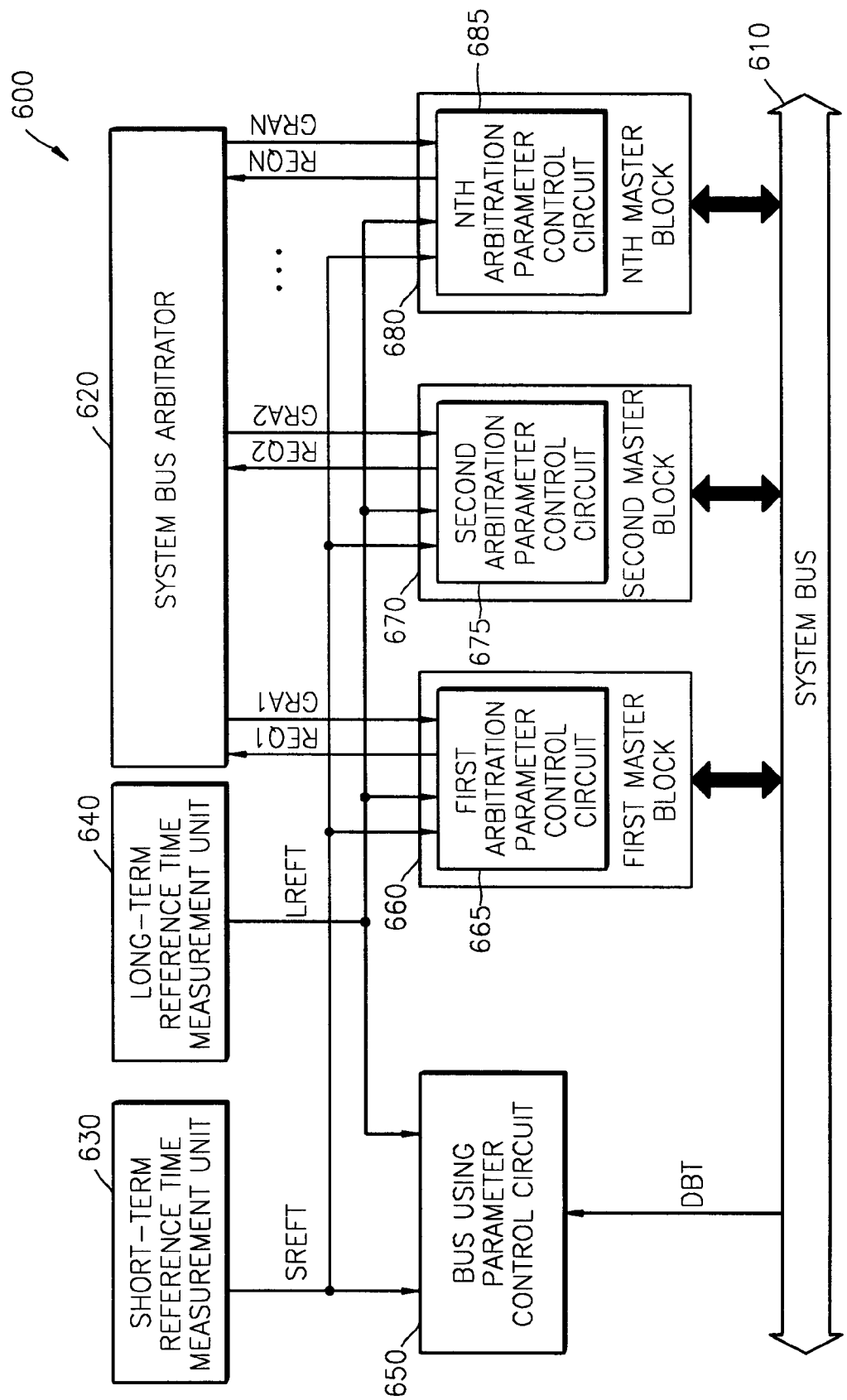
FIG. 6 is a block diagram of a system-on-chip SOC according to the third embodiment of the present invention.

FIG. 6 is a block diagram of a system-on-chip SOC according to the third embodiment of the present invention.

Referring to FIG. 6, a SOC 600 which has a system bus 610, first through $n^{th}$ master blocks 660 through 680 which transmit data through the system bus 610 and an arbitrator 620 which controls occupation of the system bus 610 of the master blocks 660 through 680 include a bus using parameter control circuit 650, a short term reference time measurement unit 630 and a long term reference time measurement unit 640. The first through $n^{th}$ master blocks 660 through 680 include arbitration parameter control circuits 665 through 685, respectively.

The bus using parameter control circuit 650 measures the number DBT of data transferring performed via the system bus 610 during a predetermined short term reference time in response to a predetermined short term reference time signal SREFT and generates the measured number DBT as a short term bus using parameter. Further, the bus using parameter control circuit 650 generates the accumulated short term bus using parameter during a predetermined long term reference time as a long term bus using parameter in response to a predetermined long term reference time signal LREFT.

The bus using parameter control circuit 650 includes elements of the bus using parameter generating circuit 500 of FIG. 5 other than the short term reference time measurement unit 515 and the long term reference time measurement unit 550. The bus using parameter control circuit 650 receives the short term reference time signal SREFT and the long term reference time signal LREFT from the short term reference time measurement unit 630 and the long term reference time measurement unit 640, respectively, and performs the same operations of the bus using parameter generating circuit 500 of FIG. 5. Therefore, detailed description of the operations of the bus using parameter control circuit 650 will not be repeated.

In response to the clock signal, the short term reference time measurement unit 630 generates the short term reference time signal SREFT which is generated at every short term reference time. The long term reference time measurement unit 640 generates the long term reference time signal LREFT in response to the short term reference time signal whenever a predetermined long term reference time is over.

The short term reference time measurement unit 630 is same as the short term reference time measurement units 315 and 515 of FIGS. 3 and 5. The long term reference time measurement unit 640 is same as the long term reference time measurement units 350 and 550 of FIGS. 3 and 5. Therefore, their detailed descriptions will not be repeated.

The first through $n^{th}$ master blocks 660, 670 and 680 include first, second and $n^{th}$ arbitration parameter control circuits 665, 675, and 685, respectively. The first, second and $n^{th}$ arbitration parameter control circuits 665, 675, and 685 function in the same manner, and thus only the first arbitration parameter control circuit 665 will be described.

The first arbitration parameter control circuit 665 receives a request signal REQ1 which is generated for the master block 660 to occupy the system bus 610, and a grant signal GRA1 which is generated for the arbitrator 620 to allow the master block 660 to occupy the system but 610. The first arbitration parameter control circuit 665 also counts the number of the request signal REQ1 and the grant signal GRA1 generated at a first logic level and generates the short term arbitration parameter in response to the short term reference time signal SREFT, and continuously accumulates the short term arbitration parameter during a predetermined time and generates the accumulated short term arbitration parameter as the long term arbitration parameter in response to the long term reference time signal LREFT.

The arbitration parameter control circuit 665 includes elements of the arbitration parameter generating circuit of FIG. 3 other than the short term reference time measurement unit 315 and the long term reference time measurement unit 350. The arbitration parameter control circuit 665 receives the short term reference time signal SREFT and the long term reference time signal LREFT from the short term reference time measurement unit 630 and the long term reference time measurement unit 640 and performs the same operations as those of the arbitration parameter generating circuit 300 of FIG. 3. Therefore, detailed descriptions of the operations will not be repeated.

The SOC 600 of FIG. 6 includes the arbitration parameter generating circuit 300 of FIG. 3 and the bus using parameter generating circuit 500 of FIG. 5 to obtain parameters which can be used to adjust the priority or the occupation value of the system bus arbitrator 620, and allows the plurality of master blocks 660, 670 and 680 to occupy the system bus 610 effectively based on the obtained parameters.

As described above, the parameter generating circuit and the method of generating parameters provide parameters used in determining the priority or the occupation value of the arbitrator so that the system on chip SOC having a plurality of master blocks can effectively occupy the system bus.

While this invention has been particularly described with reference to preferred embodiments thereof, it will be understood by those skilled in the art that various changes in form and details may be made therein without departing from the spirit and scope of the invention as defined by the appended claims and equivalents thereof.

What is claimed is:

1. An arbitration parameter generating circuit comprising:
   a counter which receives a request signal generated in order for a master block to occupy a system bus and a grant signal generated in order for an arbitrator to allow the master block to occupy the system bus, up-counts when the request signal is at a first logic level, down-counts when the grant signal is at the first logic level, and is reset in response to a predetermined short term reference time signal;
   a short term arbitration parameter storage unit which receives and stores the counted signal as the short term arbitration parameter until the counter is reset in response to the short term reference time signal;
   a short term reference time measurement unit which generates the short term reference time signal in response to a clock signal whenever the short term reference time is over, in which the short term reference time indicates a time period for which the short term arbitration parameter is stored in the short term arbitration parameter storage unit;
   a long term arbitration parameter control unit which continuously accumulates the short term arbitration parameter outputted from the short term arbitration parameter storage unit, outputs the accumulated short term arbitration parameter as a long term arbitration parameter, and is reset in response to a long term reference time signal; and
   a long term reference time measurement unit which generates a long term reference time signal in response to the short term reference time signal whenever the long term reference time is over.

2. The arbitration parameter generating circuit of claim 1, wherein the long term arbitration parameter control unit comprises:
   an adder which continuously accumulates the short term arbitration parameter outputted from the short term arbitration parameter storage unit;
   a register which stores output of the adder and is reset in response to the long term reference time signal; and
   a long term arbitration storage unit which stores output of the register as the long term arbitration parameter in response to the long term reference time signal.

3. The arbitration parameter generating circuit of claim 2, wherein the long term reference time measurement unit comprises:
   a long term counter which counts the number of generations of the short term reference time signal and is reset in response to the long term reference time signal; and
   a long term comparing unit which previously stores the time when the long term arbitration parameter is stored in the long term arbitration parameter storage unit as the long term reference time, and generates the long term reference time signal when output of the long term counter reaches the long term reference time.

4. The arbitration parameter generating circuit of claim 2, wherein the long term reference time signal is generated at or before every $2^{n-p}$ times of the time when the short term reference time signal is generated, in which n denotes a bit width of the adder, and p denotes the number of bits of the short term arbitration parameter outputted from the short term arbitration parameter storage unit.

5. The arbitration parameter generating circuit of claim 1, wherein the short term reference time measurement unit comprises:
- a short term counter which counts the clock signal and is reset in response to the short term reference time signal; and
- a short term comparing unit which previously stores the time when the short term arbitration parameter is stored in the short term arbitration parameter storage unit as a short term reference time and generates the short term reference time signal when output of the short term counter reaches the short term reference time.

6. The arbitration parameter generating circuit of claim 5, wherein the short term reference time signal is generated at or before every $2^m$ times of a period of the clock signal, in which m denotes a bit width of the short term counter.

7. The arbitration parameter generating circuit of claim 1, wherein the short term arbitration parameter is calculated by subtracting the number of generations of the grant signal at the first logic level from the number of generation of the request signal at the first logic level.

8. The arbitration parameter generating circuit of claim 1, wherein the short term arbitration parameter is only the upper p bits selected from output of the counter.

9. A bus using parameter generating circuit comprising:
- a counter which up-counts data in response to a clock signal, while the data is transferred via a system bus, and is reset in response to a predetermined short term reference time signal;
- a short term bus using parameter storage unit which receives and stores up-counted data as a short term bus using parameter until the counter is reset in response to the short term reference time signal;
- a short term reference time measurement unit which generates the short term reference time signal whenever the short term reference time is over, the short term reference time indicating a time period for which the short term bus using parameter is stored in the short term bus using parameter storage unit;
- a long term bus using parameter control unit which continuously accumulates the short term bus using parameter outputted from the short term bus using parameter storage unit for a predetermined time, outputs the accumulated short term bus using parameter as a long term bus using parameter and is reset in response to a predetermined long term reference time signal; and
- a long term reference time measurement unit which generates the long term reference time signal in response to the short term reference time signal whenever the long term reference time is over.

10. The bus using parameter generating circuit of claim 9, wherein the long term bus using parameter control unit comprises:
- an adder which continuously accumulates the short term bus using parameter outputted from the short term bus using parameter storage unit;
- a register which stores output of the adder and is reset in response to the long term reference time signal; and
- a long term bus using parameter storage unit which stores output of the register as the long term bus using parameter in response to the long term reference time signal.

11. The bus using parameter generating circuit of claim 10, wherein the long term reference time measurement unit comprises:
- a long term counter which counts the number of generations of the short term reference time signal and is reset in response to the long term reference time signal; and
- a long term comparing unit which previously stores the time when the long term arbitration parameter is stored in the long term arbitration parameter storage unit as the long term reference time, and generates the long term reference time signal when output of the long term counter reaches the long term reference time.

12. The bus using parameter generating circuit of claim 10, wherein the long term reference time signal is generated at or before every $2^{n-p}$ times of the time when the short term reference time signal is generated, in which n denotes a bit width of the adder, and p denotes the number of bits of the short term bus using parameter outputted from the short term bus using parameter storage unit.

13. The bus using parameter generating circuit of claim 9, wherein the short term reference time measurement unit comprises:
- a short term counter which counts the clock signal and is reset in response to the short term reference time signal; and
- a short term comparing unit which previously stores the time when the short term arbitration parameter is stored in the short term arbitration parameter storage unit as a short term reference time and generates the short term reference time signal when output of the short term counter reaches the short term reference time.

14. The bus using parameter generating circuit of claim 13, wherein the short term reference time signal is generated at or before every $2^m$ times of a period of the clock signal, in which m denotes a bit width of the short term counter.

15. The bus using parameter generating circuit of claim 9, wherein the short term bus using parameter is equal to the number of data transfers via the system bus.

16. The bus using parameter generating circuit of claim 9, wherein the short term bus using parameter is only the upper p bits selected from output of the counter.

17. A system on chip including a system bus, first through $n^{th}$ master blocks that transfer data via the system bus, and an arbitrator that controls occupation of the system bus by the master blocks, the system on chip comprising:
- a bus using parameter control circuit which measures the number of data transfers via the system bus for a predetermined short term reference time in response to a predetermined short term reference time signal, generates the measured number as a short term bus using parameter, and generates a short term bus using parameter, which is accumulated during a predetermined time, as a long term bus using parameter in response to a predetermined long term bus using parameter signal;
- a short term reference time measurement unit which generates the short term reference time signal in response to a clock signal whenever the short term reference time is over; and
- a long term reference time measurement unit which generates the long term reference time signal in response to the short term reference time signal whenever a predetermined long term reference time is over,
wherein each of the first through $n^{th}$ master blocks includes an arbitration parameter control circuit which receives a request signal generated for the master blocks to occupy the system bus and a grant signal generated for the arbitrator to allow the master blocks to occupy the system bus, counts the number of generations of the request signals and the grant signals at a first logic level in response to the short term reference time signal, generates a short term arbitration parameter, continuously accumulates the short term arbitration parameter for a predetermined time in response to the long term reference time signal and generates the accumulated short term arbitration parameter as a long term arbitration parameter.

18. The system on chip of claim 17, wherein the bus using parameter control circuit comprises:
    a bus counter which up-counts the data in response to the clock signal, while the data are transferred via the system bus, and is reset in response to the short term reference time signal;
    a short term bus using parameter storage unit which receives and stores the up-counted data as the short term bus using parameter in response to the short term reference time signal until the bus counter is reset; and
    a long term bus using parameter control unit which continuously accumulates the short term bus using parameter outputted from the short term bus using parameter storage unit during a predetermined time, outputs the accumulated short term bus using parameter as the long term bus using parameter, and is reset in response to a predetermined long term reference time signal.

19. The system on chip of claim 18, wherein the long term bus using parameter control unit comprises:
    a bus adder which continuously accumulates the short term bus using parameter outputted from the short term bus using parameter storage unit;
    a bus register which stores output of the adder and is reset in response to the long term reference time signal; and
    a long term bus using parameter storage unit which stores output of the register as the long term bus using parameter in response to the long term reference time signal.

20. The system on chip of claim 17, wherein the arbitration parameter control circuit comprises:
    a counter which receives the request signal and the grant signal, up-counts when the request signal is at a first logic level, and down-counts when the grant signal is at the first logic level, and is reset in response to a predetermined short-time reference time signal;
    a short term arbitration parameter storage unit which receives and stores the counted signals as a short term arbitration parameter in response to the short term reference time signal until the counter is reset; and
    a long term arbitration parameter control unit which continuously accumulates the short term arbitration parameter outputted from the short term arbitration parameter storage unit, outputs the accumulated short term arbitration parameter as a long term arbitration parameter and is reset in response to a predetermined long term reference time signal.

21. The system on chip of claim 17, wherein the long term arbitration parameter control unit comprises:
    an adder which continuously accumulates the short term arbitration parameter outputted from the short term arbitration parameter;
    a register which stores output of the adder and is reset in response to the long term reference time signal; and
    a long term arbitration storage unit which stores output of the register as the long term arbitration parameter in response to the long term reference time signal.

22. A method of generating an arbitration parameter which decides priority of master blocks transferring data via a system bus, the method comprising:
    (a) generating a short term reference time signal which decides the time when storing a predetermined short term arbitration parameter in response to a clock signal;
    (b) receiving a request signal generated for the master blocks to occupy the system bus and a grant signal generated for the arbitrator to allow the master blocks to occupy the system bus and generating a short term arbitration parameter in response to the short term reference time signal;
    (c) generating a long term reference time signal which decides the time when storing a predetermined long term arbitration parameter in response to the short term reference time signal; and
    (d) continuously accumulating the short term arbitration parameter for a predetermined time in response to the long term reference time signal and outputting the accumulated short term arbitration parameter as a long term arbitration parameter.

23. The method of claim 22, wherein step (b) further comprises:
    (b1) up-counting when the request signal is at the first logic level, down-counting when the grant signal is at the first logic level and outputting the counted value as a short term arbitration parameter; and
    (b2) resetting the counted signal in response to the short term reference time signal and counting the request signal and the grant signal according their logic level.

24. The method of claim 22, wherein the short term arbitration parameter is calculated by subtracting the number of generations of the grant signal at the first logic level from the number of generations of the request signal at the first logic level.

25. The method of claim 22, wherein step (d) further comprises:
    (d1) continuously accumulating the short term arbitration parameter and outputting the accumulated short term arbitration parameter as the long term arbitration parameter; and
    (d2) resetting the accumulated short term arbitration parameter in response to the long term reference time signal, continuously accumulating the short term arbitration parameter and outputting the accumulated short term arbitration parameter as the long term arbitration parameter.

26. The method of claim 22, wherein the short term reference time signal is generated at a shorter interval than the long term reference time signal.

27. A method of generating a bus using parameter which decides priority of master blocks transferring data via a system bus, the method comprising:
    (a) generating a short term reference time signal which decides a time to store a predetermined short term bus using parameter in response to a clock signal;
    (b) up-counting data in response to the clock signal and the short term reference time signal whenever the data are transferred via the system bus and outputting the counted data as the short term bus using parameter;
    (c) generating a long term reference time signal which decides a time to accumulate the short term bus using parameter in response to the short term reference time signal; and
    (d) continuously accumulating the short term bus using parameter for a predetermined time in response to the long term reference time signal and outputting the accumulated short term bus using parameter as a long term bus using parameter.

28. The method of claim 27, wherein step (b) further comprises:
(b1) up-counting data in response to the clock signal while the data are transferred via the system bus and outputting the counted data as the short term bus using parameter; and
(b2) resetting the counted data in response to the short term reference time signal, and up-counting reset data in response to the clock signal while the data are transferred via the system bus and outputting the counted data as the short term bus using parameter.

29. The method of claim 27, wherein the short term bus using parameter is the number of data transfers via the system bus.

30. The method of claim 27, wherein step (d) further comprises:
(d1) continuously accumulating the short term bus using parameter and outputting the accumulated short term bus using parameter as a long term bus using parameter; and
(d2) resetting the accumulated short term bus using parameter in response to the long term reference time signal, and continuously accumulating the reset short term bus using parameter and outputting the accumulated short term bus using parameter as a long term bus using parameter.

31. The method of claim 27, wherein the short term reference time signal is generated at a shorter interval than the long term reference time signal.

* * * * *